United States Patent
Yagasaki et al.

[11] Patent Number: 5,862,300
[45] Date of Patent: Jan. 19, 1999

[54] CONTROL OF AN IMAGE DISPLAY BASED ON A PERMISSION SIGNAL

[75] Inventors: Yoichi Yagasaki; Motoki Kato; Yasushi Fujinami, all of Kanagawa, Japan

[73] Assignee: Sony Corporation, Tokyo, Japan

[21] Appl. No.: 967,078

[22] Filed: Nov. 10, 1997

Related U.S. Application Data

[63] Continuation of Ser. No. 675,525, Jul. 3, 1996, abandoned.

[30] Foreign Application Priority Data

Jul. 7, 1995 [JP] Japan .................................. 7-171992

[51] Int. Cl.$^6$ .............................. H04N 5/91; H04N 5/928
[52] U.S. Cl. ................................................ 386/94; 386/97
[58] Field of Search .................................. 386/94, 95, 96, 386/97, 46, 54, 75, 104; 360/18, 15; H04N 5/91, 5/928

[56] References Cited

U.S. PATENT DOCUMENTS 5,510,902  4/1996  Fujinami et al. ........................ 358/335
5,703,997  12/1997  Kitamura et al. ........................ 386/97

*Primary Examiner*—Robert Chevalier
*Attorney, Agent, or Firm*—Frommer Lawrence & Haug, LLP; William S. Frommer

[57] ABSTRACT

The display of an image in a mode which is against the intentions of the producer is made possible. An additional information decoder decodes timing information and edge_crop_flag from additional information codes supplied from a demultiplexer, and outputs them to a controller. The flag edge_crop_flag indicates whether or not a display in the edge cropped mode is permitted by the producer of the image. The controller turns on a horizontal filter and turns off a vertical filter when this flag indicates the permission in the edge cropped mode or when the edge cropped mode is instructed from an external control signal, and causes an image in the edge cropped mode to be displayed on a monitor having an aspect ratio of 4:3. When the edge cropped mode is prohibited, the horizontal filter is turned off, and the vertical filter is turned on, causing the image to be displayed in the letter box mode.

16 Claims, 12 Drawing Sheets

CONTROL OF AN IMAGE DISPLAY BASED ON A PERMISSION SIGNAL

This application is a continuation of application Ser. No. 08/679,525, filed on Jul. 3, 1996 now abandoned.

BACKGROUND OF THE INVENTION

1. Field of the Invention

The present invention relates to a coding apparatus and method, a decoding apparatus and method, and a record medium. More particularly, the present invention relates to a coding apparatus and method, a decoding apparatus and method, and a record medium, in which an image can be prevented from being displayed in a display state which is against the intentions of the producer.

2. Description of the Related Art

FIG. 10 shows an example of the construction of a conventional coding apparatus for coding image signals. In this example, an image generated in an image generating apparatus 1 is supplied to a video coder 11 of a coding apparatus 2 in accordance with a predetermined sequence. The image generating apparatus 1 further generates a frame number and outputs it to the video coder 11. Furthermore, the image generating apparatus 1 time information for the generated image and supplies it to a multiplexer 12 of the coding apparatus 2. The video coder 11 codes the input image and outputs the coded data (video codes) to the multiplexer 12. The multiplexer 12 multiplexes the video codes input from the video coder 11 onto the time information input from the image generating apparatus 1, and outputs it as a bitstream.

Next, the operation of the coding apparatus will be described. The video coder 11 codes the image input from the image generating apparatus 1 together with the frame number by an MPEG (Moving Picture Experts Group) method. Then, the video coder 11 outputs the video codes obtained as a result of the coding to the multiplexer 12. The multiplexer 12 multiplexes the time information output from the image generating apparatus 1 onto the video codes output from the video coder 11, and outputs it as a bitstream.

FIG. 11 shows an example of the construction of a decoding apparatus for decoding a bitstream which is coded by the coding apparatus and which is output therefrom in this way. In this example, a bitstream is input to a demultiplexer 31 of a decoding apparatus 21. The demultiplexer 31 demultiplexes (isolates) video codes from the input bitstream. The video codes output from the demultiplexer 31 are input to a video decoder 32. The video decoder 32 decodes the input video codes and outputs an image to a horizontal filter 33. The horizontal filter 33 performs an operation of enlarging or reducing the horizontal length of the input image signals, and outputs it to a vertical filter 34. The vertical filter 34 performs an operation of enlarging or reducing the vertical length of the input signals, and outputs it to a monitor 22 and a monitor 23.

The time information isolated by the demultiplexer 31, and the frame number which is decoded and output by the video decoder 32 are not particularly used in this example. Therefore, a description thereof is omitted.

A control signal is input to a controller 35 from an apparatus (not shown). The controller 35, in response to this control signal, controls the horizontal filter 33 and the vertical filter 34.

In the image decoding apparatus shown in FIG. 11, an encoder for converting the image signals output from the video decoder 32 into signals of an NTSC (National Television System Committee) system is omitted.

Next, the operation of the image decoding apparatus will be described below. The demultiplexer 31 isolates video codes from the input bitstream and outputs them to the video decoder 32. The video decoder 32 isolates image signals from the input video codes and outputs them to the horizontal filter 33.

The image signals obtained as a result of decoding by the video decoder 32, as shown in FIG. 12(A), are made to be an image for the monitor 23 having an aspect ratio of 16:9. That is, for this image, an image to be displayed on the monitor 23 having an aspect ratio of 16:9 is made to be an image having an aspect ratio of 4:3 by compressing (thereby forming into an oblong image) the length of the image in a horizontal direction, thus forming an oblong image having an aspect ratio of 4:3.

In a case in which the user sees this decoded image on the monitor 23 having an aspect ratio of 16:9, the user inputs an external control signal to the controller 35, causing the horizontal filter 33 to be turned off, as well as the vertical filter 34. As a result, the oblong image, shown in FIG. 12(A), which is output from the video decoder 32, is output unchanged from the horizontal filter 33 which is turned off, as shown in FIG. 12(C). At this time, since the vertical filter 34 is also turned off, the vertical filter 34, as shown in FIG. 12(E), outputs this image as is on the monitor 23. Since the monitor 23 has an aspect ratio of 16:9, an image (an oblong image) whose length is compressed in the horizontal direction is expanded in the horizontal direction. As a result, a normal image (an image whose ratio of length to width is the same and which has no lost portions), shown in FIG. 12(I), is displayed on the monitor 23. As a result, it is possible to enjoy a dynamic image having a wide screen.

Incidentally, in a case in which the user does not have a monitor 23 having an aspect ratio of 16:9, but has only a monitor 22 having an aspect ratio of 4:3, the user is able to select and instruct any one of the modes such as a squeezed mode, a letter box mode, and an edge cropped mode by inputting an external control signal to the controller 35.

The controller 35, when the squeezed mode is instructed, turns off both the horizontal filter 33 and the vertical filter 34. As a result, when the image shown in FIG. 12(E) is input to the vertical filter 34, the vertical filter 34 outputs the image as is onto the monitor 22 without performing any special process. As a result, an oblong image shown in FIG. 12(H) is displayed as is on the monitor 22 having an aspect ratio of 4:3.

On the other hand, in a case in which a letter box mode is instructed, the controller 35 turns off the horizontal filter 33 and turns on the vertical filter 34. When an oblong image shown in FIG. 12(C) is input via the horizontal filter 33, the vertical filter 34 performs an operation of compressing the length of the image in the vertical direction. As a result of this operation, an image is obtained whose ratio of length to width is the same. However, since regions where there is substantially no image, are formed in the upper and lower portions of the screen having an aspect ratio of 4:3, a black-level image is inserted into those regions, and thus an image such as that shown in FIG. 12(D) is formed. When this image is output from the vertical filter 34 and is displayed on a monitor 22 having an aspect ratio of 4:3, as shown in FIG. 12(G), an image in which no-signal regions are formed in the upper and lower portions of the screen is displayed as a normal image whose ratio of length to width is 1:1.

Further, when an edge cropped mode is instructed, the controller 35 turns on the horizontal filter 33 and turns off the vertical filter 34. When an oblong image shown in FIG. 12(A) is input from the video decoder 32, the horizontal filter 33 removes the image near the left and right end portions of this image. As a result, an image shown in FIG. 12(B) is obtained. When this image is displayed on the monitor 22 having an aspect ratio of 4:3 via the vertical filter 34, an image such as that shown in FIG. 12(F) is displayed on the monitor 22. This image is an image whose ratio of length to width is 1:1; however, a part of the image near the left and right end portions of this image is lost.

As described above, the edge cropped mode from among the above-described modes is a mode in which a part of an image is cut and displayed in order to adjust it to a monitor having an aspect ratio of 4:3. For this reason, since in this mode an image different from the intentions of the producer of the image is displayed, there is a risk in that a problem concerning copyright might occur.

In order to avoid this problem, by making the producer of the image specify by a portion of the image to be cut in the edge cropped mode, permission for coding the image may thus be obtained. However, for example, when a title or a person's name is displayed on the entire screen, it is often not possible to cut any portion. In such a case, since a part of the title or the person's name is cut when a display is made in the above-described edge cropped mode, as a result, a situation may arise in which permission for coding the image (e.g., a movie) and recording it on a record (recording, recordable or recorded) medium, and for transmitting the image cannot be obtained from the producer of the image.

SUMMARY OF THE INVENTION

The present invention has been achieved in view of the above-described situation. It is an object of the present invention to prevent an image from being displayed in a display state when is against the intentions of the producer.

The coding method according to one aspect of the invention includes the steps of: coding image signals; and coding additional information including a permission signal indicating whether or not a display of an image in a predetermined display state should be permitted.

In the record medium, image signals and a permission signal indicating whether or not a display of an image in a predetermined display state should be permitted, are coded and multiplexed, and recorded.

The decoding apparatus includes isolation means for isolating the image signals and a permission signal from the input signals; and control means for controlling the display state of the isolated image signals in response to the isolated permission signal.

The decoding method includes the steps of isolating the image signals and a permission signal from the input signals; and controlling the display state of the isolated image signals in response to the isolated permission signal.

The above and further objects, aspects and novel features of the invention will become more apparent from the following detailed description when read in connection with the accompanying drawings.

DESCRIPTION OF THE PREFERRED EMBODIMENTS

The preferred embodiments of the present invention will be explained below.

Figure 1:
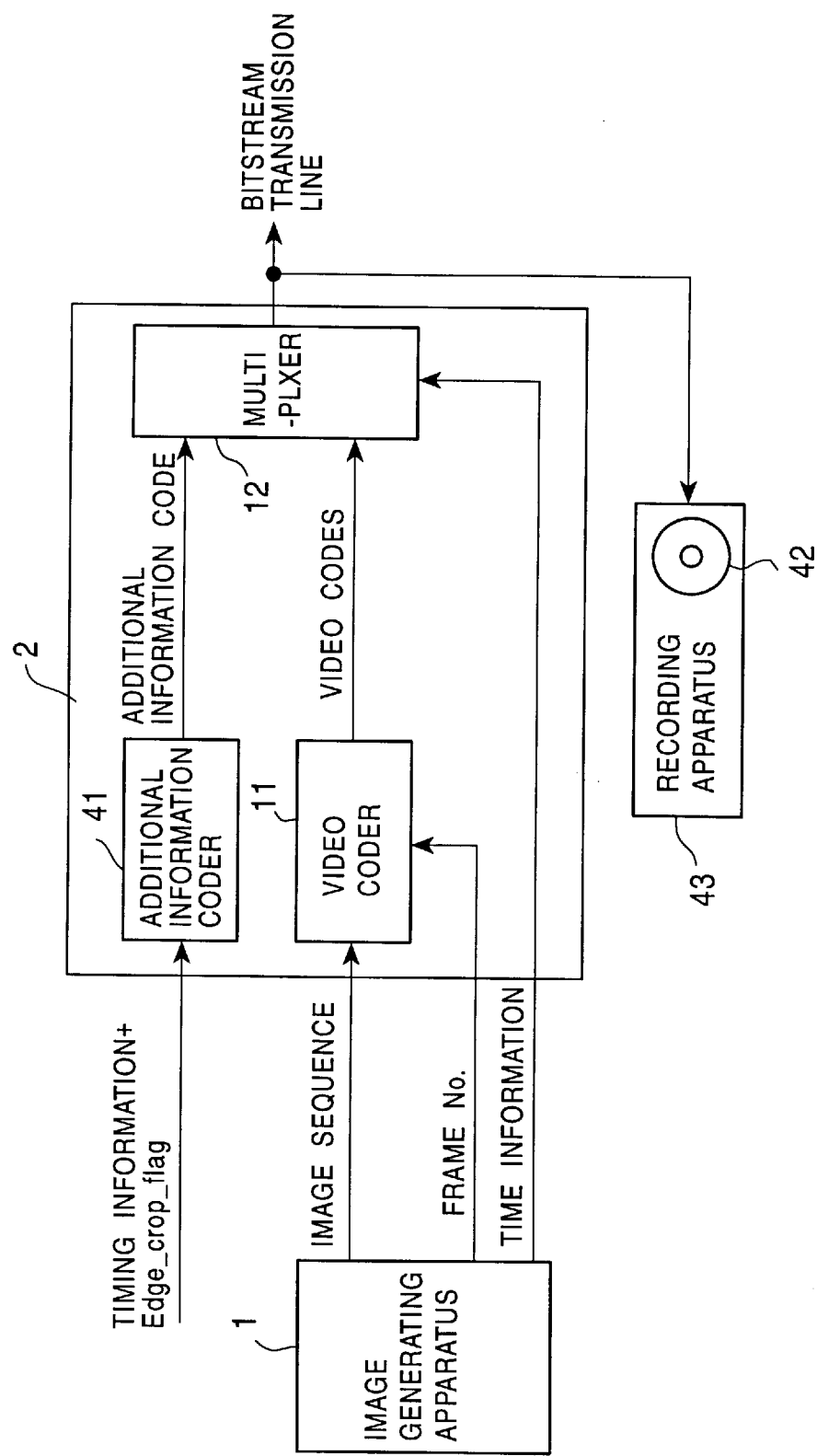
FIG. 1 is a block diagram illustrating an example of the construction of a coding apparatus of the present invention.
Figure 10:
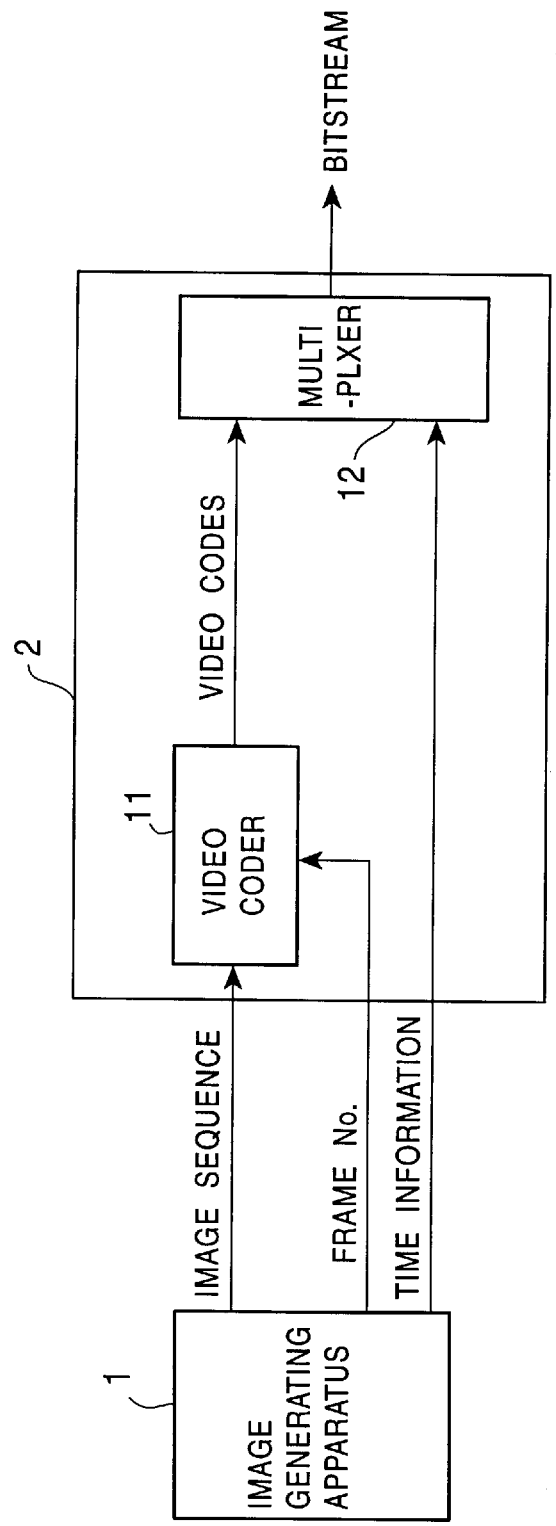
FIG. 10 is a block diagram illustrating an example of the construction of a conventional coding apparatus.

FIG. 1 is a block diagram illustrating an example of the construction of a coding apparatus of the present invention employing a coding method in accordance with the present invention. Components in FIG. 1 which correspond to those in FIG. 10 are given the same reference numerals. As shown in FIG. 1, the basic construction of this coding apparatus is the same as that shown in FIG. 10 except that the coding apparatus 2 of FIG. 1 is provided with an additional information coder 41. This additional information coder 41, when additional information including timing information and a flag Edge_crop_flag are input from an apparatus (not shown), codes this additional information, and outputs it as additional information codes to the multiplexer 12.

The multiplexer 12 multiplexes the video codes input from the video coder 11 and the time information input from the image generating apparatus 1 onto the additional information codes input from the additional information coder 41, and transmits the multiplexed codes as a bitstream to a transmission line (not shown).

This bitstream is supplied to a recording apparatus 43, and is recorded on a record (recording, recordable or recorded) medium 42, such as a digital video disk or a video tape. The other components are the same as those shown in FIG. 10.

Edge_crop_flag is a flag for indicating whether or not a display of an image in an edge cropped mode should be permitted. The timing information indicates the period (the range of the image) during which the flag is effective. Both of the Edge_crop_flag and the timing information are set based on the intentions of the producer (the owner of the copyright).

Concerning timing information, information which specifies an image in an image sequence, such as the frame number of the image or the display time, may be used. For example, the frame number of the image is expressed as a temporal reference in the MPEG video layer. The display time is expressed in the form of a presentation time stamp (PTS) or the like in the MPEG system layer. Therefore, it is possible to specify the range in which the display in the edge cropped mode is permitted by using such information.

The above-described flag and timing information are coded as additional information codes by the additional information coder 41, and are multiplexed together with the video codes output from the video coder 11 at a proper position by the multiplexer 12, and thus a bitstream is formed.

If, for example, the bitstream is an MPEG program stream, assuming that the additional information codes are a part of a PSM (Program Stream Map) in the system layer, the additional information coder 41 codes the additional information. Then, the PSM output from the additional information coder 41 is multiplexed in the more forward portion in relation to time than the position of the video codes of the image specified by the timing information by means of the multiplexer 12.

The syntax of the PSM in the MPEG2 will be shown below.

```
[Syntax or Program Stream Map]
program_stream_map() {
    packet_start_code_prefix         24 bslbf
    map_stream_id                     8 uimsbf
    program_stream_map_length        16 uimsbf
    current_next_indicator            1 bslbf
    reserved                          2 bslbf
    program_stream_map_version        5 uimsbf
    reserved                          7 bslbf
    marker_bit                        1 bslbf
    program_stream_info_length       16 uimsbf
    for (i=0;i<N;i++) {
        descriptor ()
    }
    elementary_stream_map_length     16 uimsbf
    for (i=0;i<N1;i++) {
        stream_type                   8 uimsbf
        elementary_stream_id          8 uimsbf
        elementary_stream_info_length 16 uimsbf
        for (i=0;i<N12;i++) {
            descriptor ()
        }
    }
    CRC_32                           32 rpchof
}
``` bs1bf(bit string left bit first) means that data of bit stream is arranged with the bit of the left side being at the beginning. uimsbf(unsigned integer most significant bit first) means that data of an unsigned integer is arranged with the bit of the MSB side being at the beginning. rpchof(remainder polynomial coefficients highest order first) means that coefficients of a remainder polynomial are arranged in the ascending order of its degree.

An example of writing Edge_crop_flag in the above-described descriptor() of the PSM will be shown. As a private descriptor(), Edge_crop_descriptor() is defined as shown below.

```
[Syntax of Edge_crop_descriptor]
Edge_crop_descriptor() {
    descriptor_tag        8 uimsbf
    descriptor_length     8 uimsbf
    Edge_crop_flag        1 uimsbf
    reserved              3 bslbf
    Start_PTS [32..30]    3 bslbf
    marker_bit            1 bslbf
    Start_PTS [29..15]   15 bslbf
    marker_bit            1 bslbf
    Start_PTS [14..0]    15 bslbf
```

```
-continued
    marker_bit            1 bslbf
    reserved              4 bslbf
    End_PTS [32..30]      3 bslbf
    marker_bit            1 bslbf
    End_PTS [29..15]     15 bslbf
    marker_bit            1 bslbf
    End_PTS [14..0]      15 bslbf
    marker_bit            1 bslbf
}
```

In the above edge_crop_descriptor(), descriptor_tag indicates the type of descriptor. After that, edge_crop_flag is written. The timing information indicating the effective period of this edge_crop_flag is expressed by, for example, Presentation Time Stamp (PTS). That is, as Syntax, Start_PTS indicating the start of the effective period and End_PTS indicating the end are defined.

In a case in which PSM is placed for each of a predetermined range (e.g., every several GOPs (Groups of Pictures)) of the bitstream, if it is defined that edge_crop_flag of Edge_crop_descriptor() of a certain PSM is effective in that range, the above-described timing information is not required. Thus, Edge_crop_descriptor2() having Syntax shown below can be defined. Or, even if edge_crop_flag of edge_crop_descriptor() of a certain PSM is effective until edge_crop_descriptor() appears in the PSM which follows the above PSM, the above-described timing information can be omitted and can be defined by the Edge_crop_descriptor2() shown below.

```
[Syntax of Edge_crop_descriptor2]
Edge_crop_descriptor2() {
    descriptor_tag        8 uimsbf
    descriptor_length     8 uimsbf
    Edge_crop_flag        1 uimsbf
    reserved              7 bslbf
}
```

The bitstream containing the above-described additional information codes is recorded on a record medium 42 (a digital video disk or a digital video tape), or transmitted on the transmission line.

Figure 2:
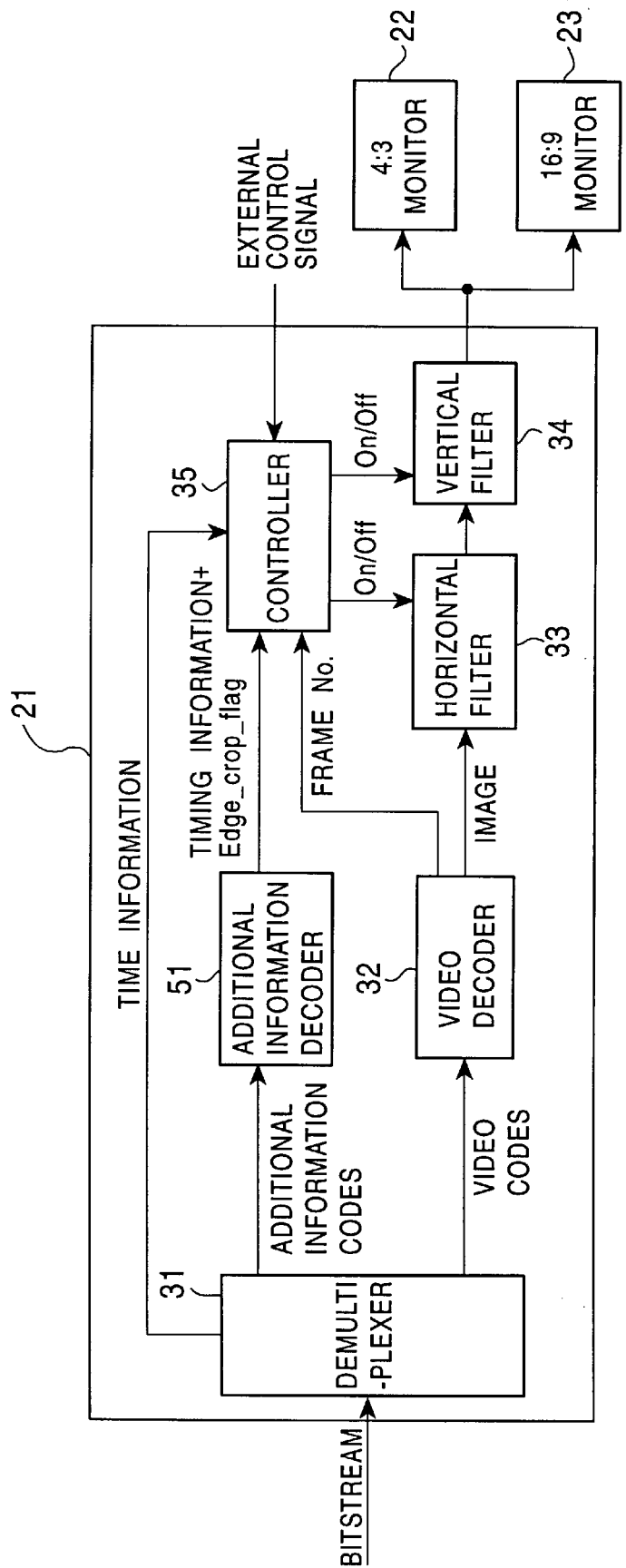
FIG. 2 is a block diagram illustrating an example of the construction of a decoding apparatus of the present invention.
Figure 11:
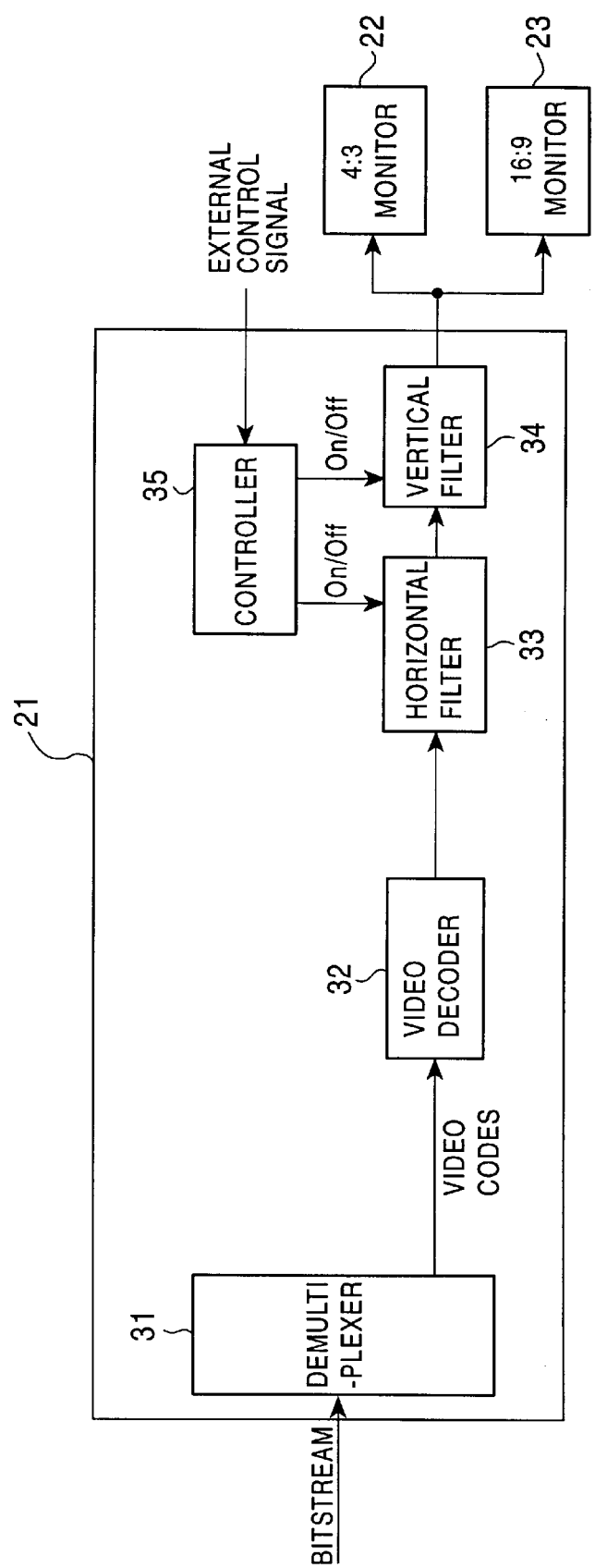
FIG. 11 is a block diagram illustrating an example of the construction of a conventional decoding apparatus.

The bitstream which is reproduced from the record medium 42 or which is transmitted through the transmission line is decoded by a decoding apparatus shown in FIG. 2. In this embodiment, the demultiplexer 31 of the decoding apparatus 21 isolates additional information codes from the input bitstream and outputs the additional information codes to an additional information decoder 51. The additional information decoder 51 decodes the input additional information codes, isolates them into timing information and edge_crop_flag, and outputs them to the controller 35. Input to this controller 35 is a frame number decoded by the video decoder 32. The controller 35 discriminates the start point and the end point of the period defined in the timing information from this timing information or the frame number. The other components are the same as those in FIG. 11.

Also in this embodiment of FIG. 2, an encoder for converting decoded image signals into signals of an NTSC system is omitted. Further, although usually, in addition to image signals, voice and data codes are transmitted and isolated, this is omitted in this embodiment.

Next, the operation of this embodiment will be described. Initially, the bitstream is isolated into video codes and additional information codes by the demultiplexer 31. These video codes are decoded by the video decoder 32, and image signals and a frame number can be obtained. The image signals are supplied to the horizontal filter 33, and the frame number is supplied to the controller 35. Further, the additional information codes are decoded as the above-described edge_crop_flag and timing information by the additional information decoder 51 and sent to the controller 35.

Figure 3:
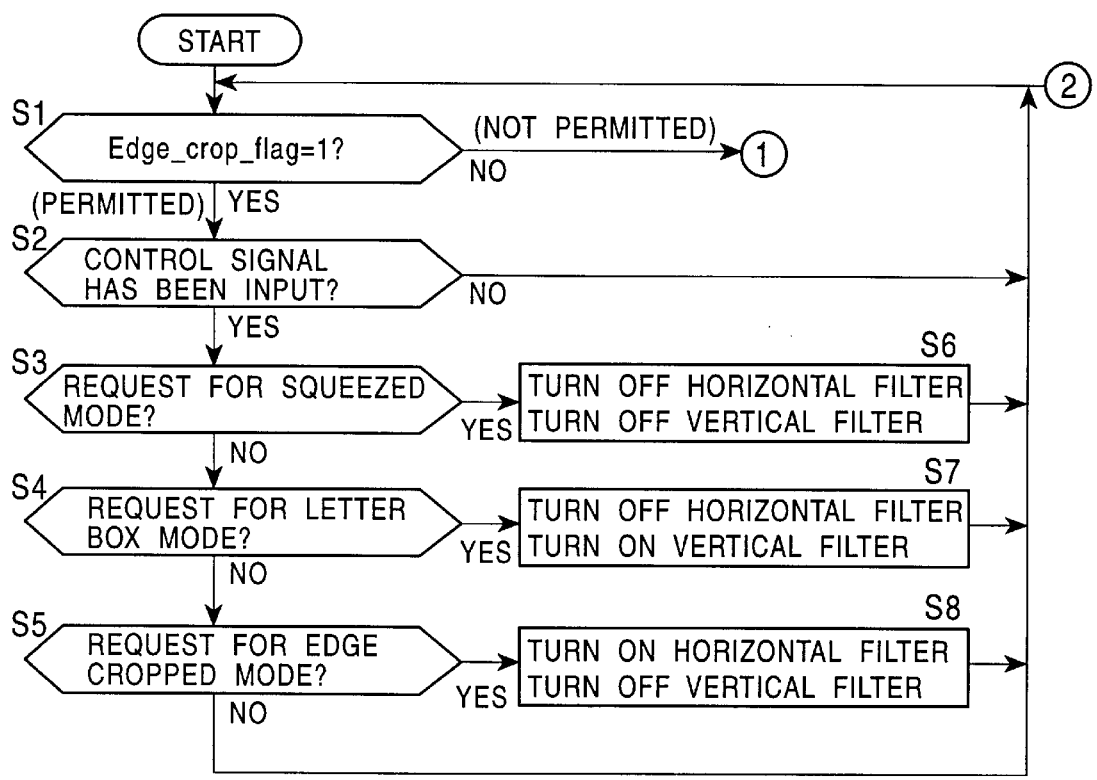
FIG. 3 is a flowchart illustrating the operation of the embodiment of FIG. 2.
Figure 4:
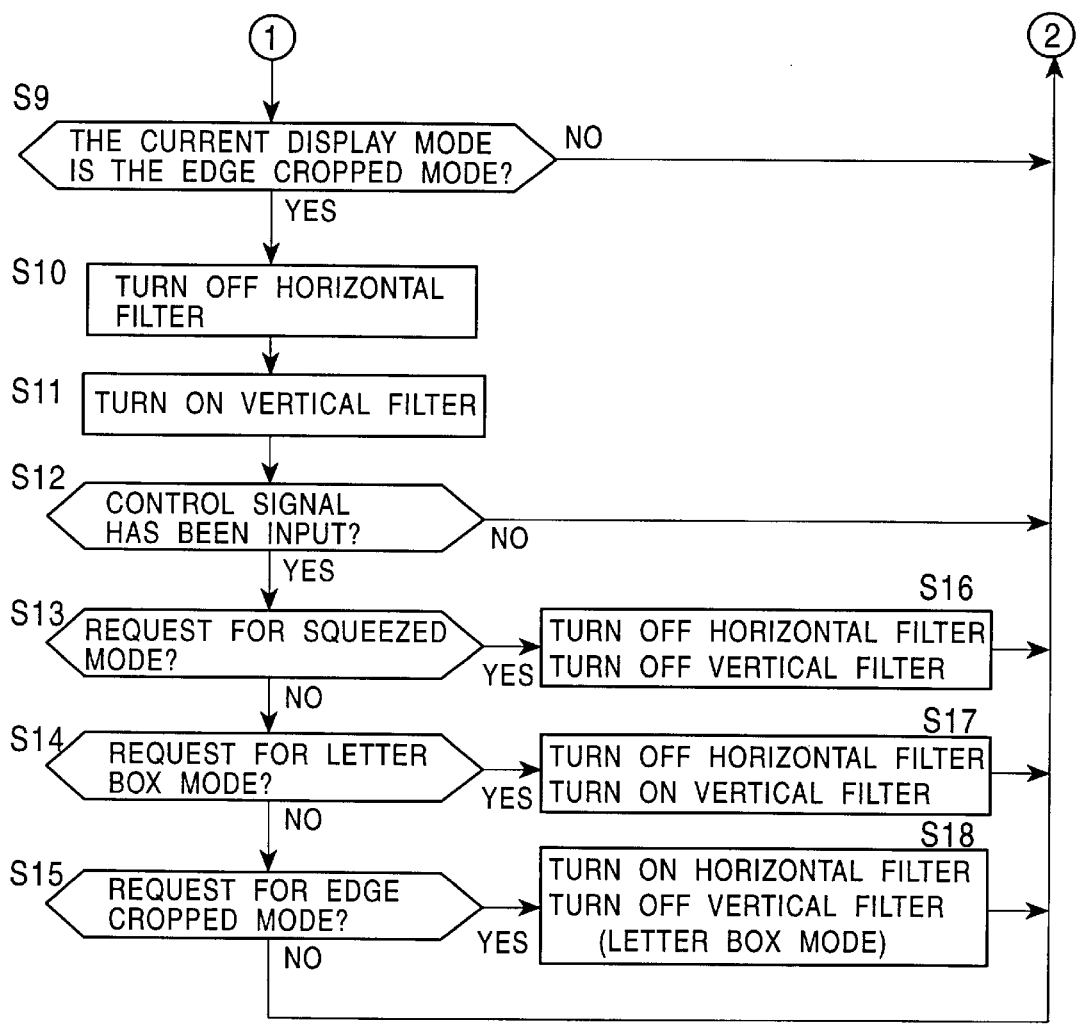
FIG. 4 is a flowchart which continues from FIG. 3.

The controller 35 controls on/off of the horizontal filter 33 and the vertical filter 34 on the basis of the input information as shown in the flowcharts of FIGS. 3 and 4.

In the first step S1, a check is made to determine if the flag edge_crop_flag is 1, namely, an edge cropped mode is permitted. When the edge cropped mode is permitted (when edge_crop_flag=1), the process proceeds to step S2 where a check is made to determine if a control signal has been input from outside. When a control signal has not been input, the process returns to step S1, and the processes of step 1 and et seq. are repeatedly performed. That is, in this case, substantially, no special process is performed (the decoded image is displayed as is).

When it is determined in step S2 that a control signal has been input, which mode of the squeezed mode, the letter box mode, and the edge cropped mode this control signal requests is determined in steps S3 to S5.

When it is determined in step S3 that the squeezed mode is requested, the process proceeds to step S6 where the controller 35 turns off the horizontal filter 33 and the vertical filter 34. That is, the squeezed mode is set. When it is determined in step S4 that the letter box mode is requested, the process proceeds to step S7 where the controller 35 turns off the horizontal filter 33 and turns on the vertical filter 34. That is, as a result, the letter box mode is set as requested. Further, when it is determined in step S5 that the edge cropped mode is requested, the process proceeds to step S8 where the controller 35 turns on the horizontal filter 33 and turns off the vertical filter 34. That is, as a result, the edge cropped mode is set as requested.

Figure 12:
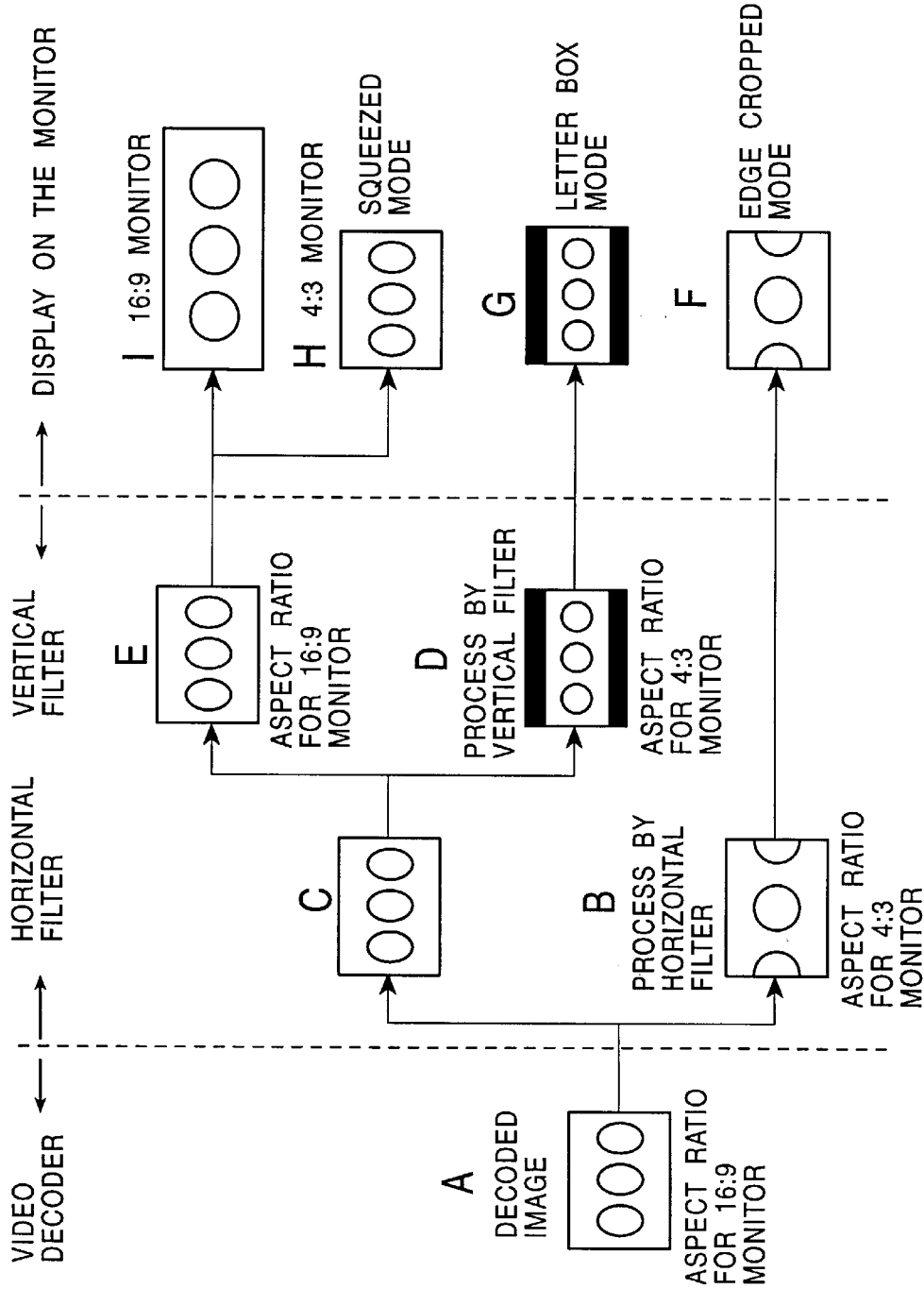
FIG. 12 shows the display mode of the example of FIG. 11.

As described above, in these cases, the squeezed mode, the letter box mode, or the edge cropped mode is set as requested in accordance with an external control signal, and the above-described image shown in FIGS. 12(H), 12(G) and 12(F) is displayed.

When it is determined in step S1 that the flag edge_crop_flag is not 1 (is 0) [a display in the edge cropped mode is not permitted (prohibited)], the process proceeds to step S9 where a check is made to determine if the current display mode is an edge cropped mode. When the display mode is not an edge cropped mode, the flag edge_crop_flag has substantially no meaning, and the process returns to step S1 without performing any special process, and the process of step 1 and et seq. is repeatedly performed.

When it is determined in step S9 that the current display mode is an edge cropped mode, the process proceeds to step S10 where the horizontal filter 33 which has been turned on in the edge cropped mode is turned off. That is, in this case, since the display in the edge cropped mode is prohibited, the display in the edge cropped mode is made to be prohibited.

Next, the process proceeds to step S11 where the vertical filter 34 which has been turned off in the edge cropped mode is turned on. That is, the processes of step S10 and step S11 produce the same result as when the letter box mode is set. Therefore, when the edge cropped mode is prohibited in the predetermined image in a state in which the edge cropped mode is set, and the image shown in FIG. 12(F) is seen, the displayed image is automatically changed to the display image of the letter box mode, shown in FIG. 12(G).

Next, the process proceeds to step S12 where a check is made to determine if a control signal has been input from outside. If a control signal has not been input, the process returns to step S1, and the processes of step 1 and et seq. are repeatedly performed. When a control signal has been input, the process proceeds from step 12 to steps S13 to S15 where which mode of the squeezed mode, the letter box mode, and the edge cropped mode has been requested is determined.

When it is determined in step S13 that the squeezed mode is requested, the process proceeds to step S16 where the controller 35 turns off both the horizontal filter 33 and the vertical filter 34. That is, as a result, the squeezed mode is set, and the image shown in FIG. 12(H) is displayed.

When, on the other hand, it is determined in step S14 that the letter box mode has been requested, the process proceeds to step S17 where the horizontal filter 33 is turned off and the vertical filter 34 is turned on. That is, as a result, the letter box mode is set, and the image shown in FIG. 12(G) is displayed.

In comparison with this, when it is determined in step S15 that the edge cropped mode has been requested, the process proceeds to step S18 where the horizontal filter 33 is turned off, and the vertical filter 34 is turned on. That is, in this case, the request is an edge cropped mode. However, in this case, since the setting of the edge cropped mode is prohibited, substantially the letter box mode is set. As a result, the image of the letter box mode shown in FIG. 12(G) is displayed.

Figure 5:
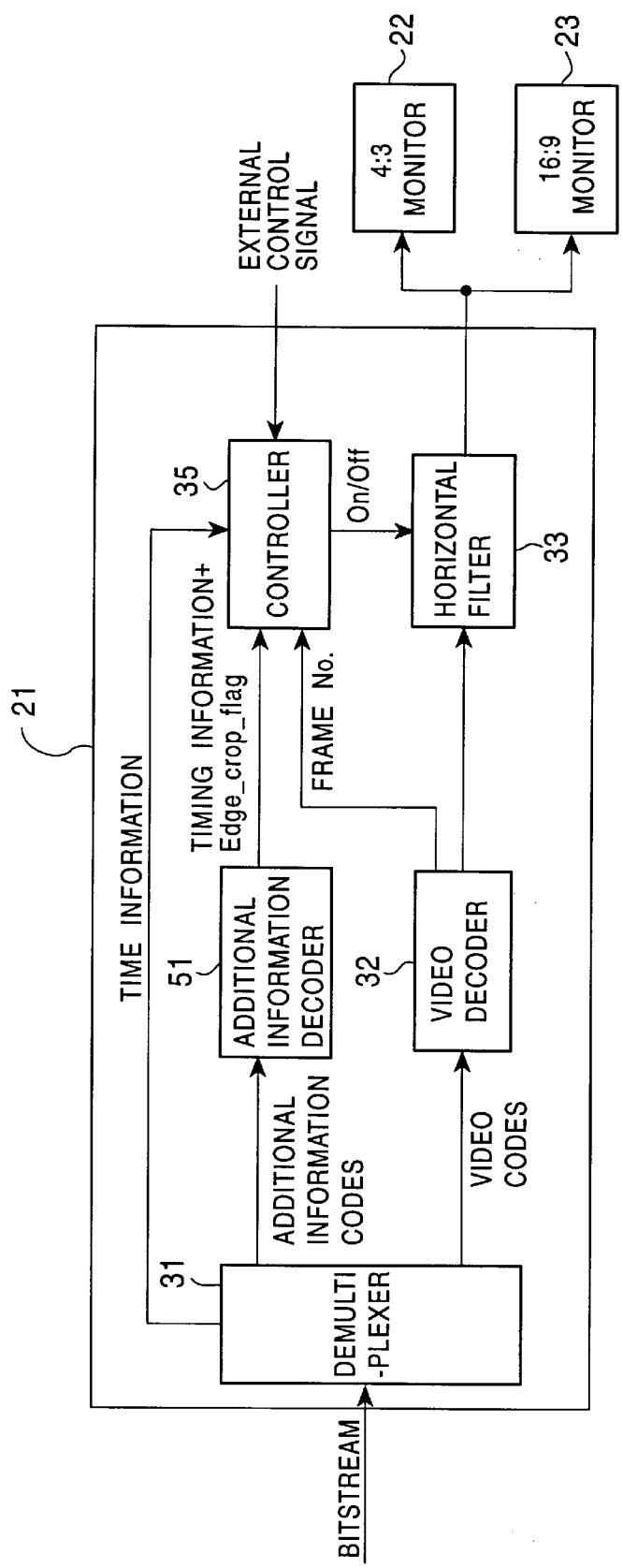
FIG. 5 is a block diagram illustrating another example of the construction of the decoding apparatus of the present invention.

FIG. 5 shows another example of the construction of the decoding apparatus. In this embodiment, the vertical filter 34 is omitted, and only the horizontal filter 33 is provided. The other components are the same as those shown in FIG. 2.

Figure 6:
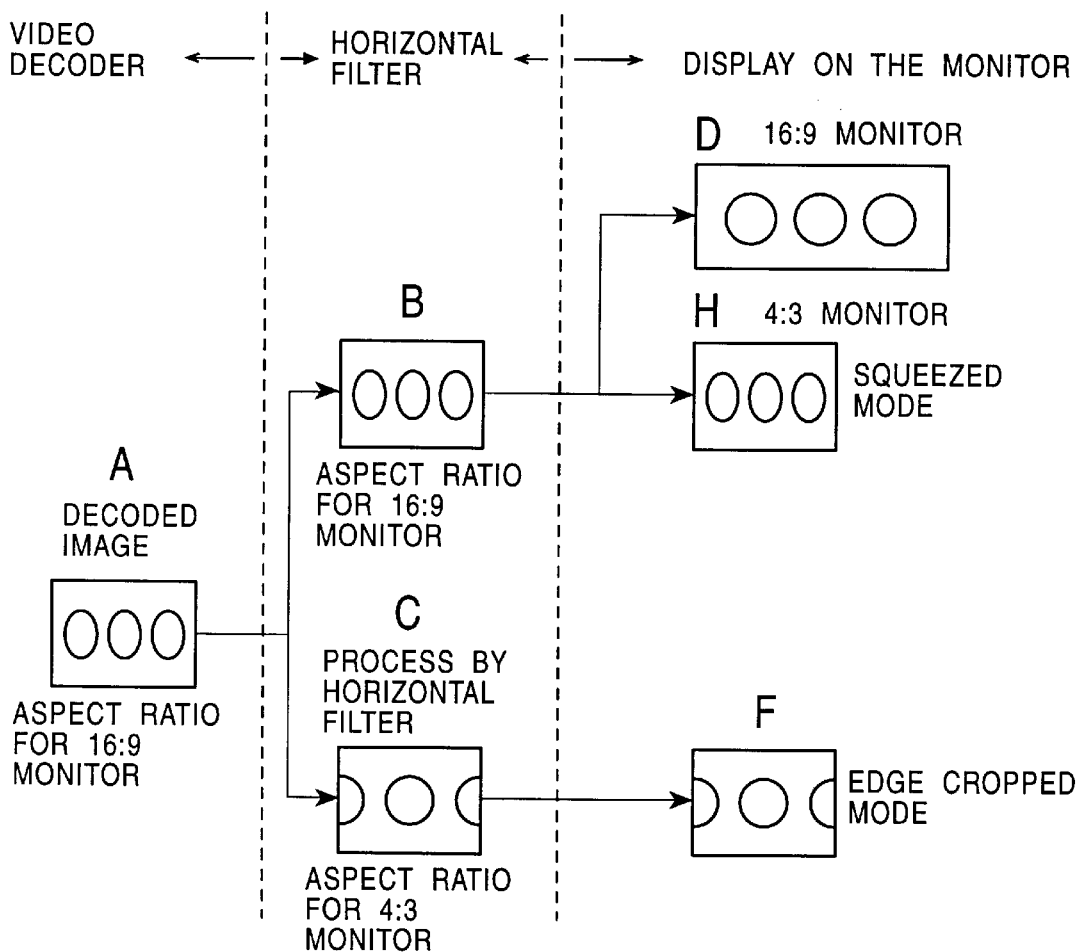
FIG. 6 shows the display mode of the embodiment of FIG. 5.

In this embodiment, as shown in FIG. 6, as the display mode, only the squeezed mode and the edge cropped mode are provided.

Figure 7:
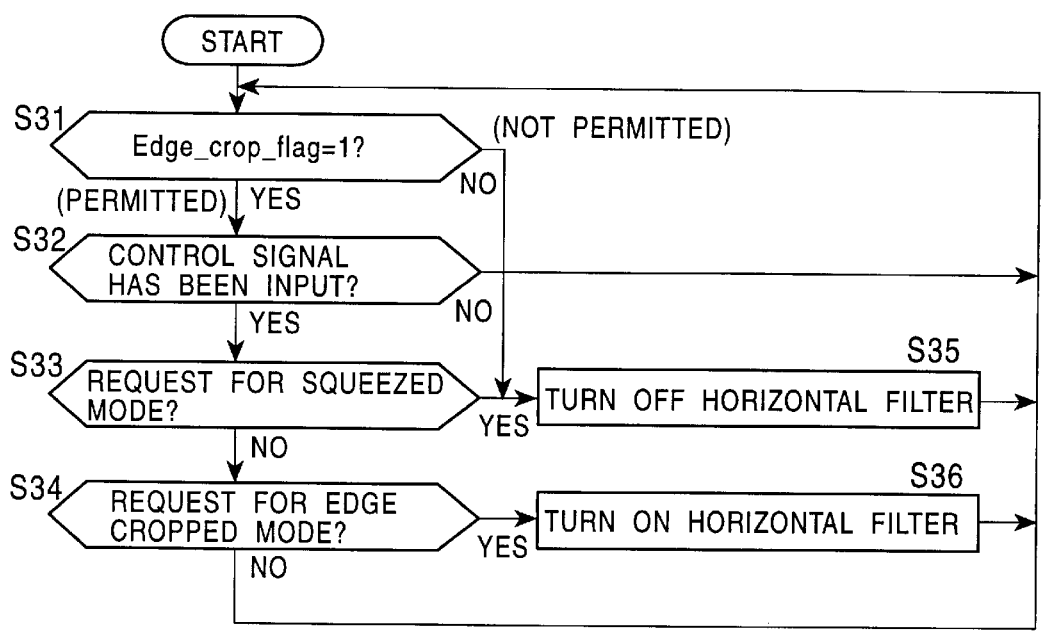
FIG. 7 is a flowchart illustrating the operation of the embodiment of FIG. 5.

The controller 35 performs the processes shown in the flowchart of FIG. 7.

Initially, in step S31, a check is made to determine if the flag edge_crop_flag is 1 (whether or not the edge cropped mode has been permitted). When this flag is 1 (when the edge cropped mode has been permitted), the process proceeds to step S32 where a check is made to determine if a control signal has been input from outside. When a control signal has not been input, the process returns to step S31 without particularly performing any process, and the processes of step S31 and et seq. are repeatedly performed.

When a control signal has been input from outside, the process proceeds to steps S33 and S34 where a check is made to determine if the request by the control signal is the squeezed mode or the edge cropped mode.

When it is determined in step S33 that the squeezed mode has been requested, the process proceeds to step S35 where the controller 35 turns off the horizontal filter 33. As a result, the oblong image shown in FIG. 6(A) output from the video decoder 32 is output as is as shown in FIG. 6(B) from the horizontal filter 33, and is displayed as an image of the squeezed mode (as an oblong image) on the monitor 22 having an aspect ratio of 4:3, as shown in FIG. 6(E). In a case in which the monitor 23 having an aspect ratio of 16:9 is connected to this decoding apparatus 21, as shown in FIG. 6(D), a normal image whose ratio of length to width is the same is displayed.

When, on the other hand, it is determined in step S34 that the edge cropped mode has been requested, the process proceeds to step S36 where the horizontal filter 33 is turned on. Therefore, the horizontal filter 33, when the oblong image shown in FIG. 6(A) is input, generates an image whose ratio of length to width is 1:1 by removing a part of the image on the left and right as shown in FIG. 6(C), and outputs the image onto the monitor 22 having an aspect ratio of 4:3. As a result, an image of the edge cropped mode, shown in FIG. 6(F), is displayed on the monitor 22.

On the other hand, when it is determined in step S31 that the flag edge_crop_flag is not 1 (is 0) (when the edge cropped mode is prohibited), the process proceeds to step S35 where the controller 35 turns off the horizontal filter 33. That is, in this case, the squeezed mode is forcibly set. As a result, the oblong image shown in FIG. 6(E) is displayed as is on the monitor 22. However, when the monitor 23 having an aspect ratio of 16:9 is connected to the decoding apparatus 21, a normal image shown in FIG. 6(D) is displayed.

As described above, in this embodiment, when the edge cropped mode is prohibited, the limitation by the control signal is made substantially to be nullified.

Figure 8:
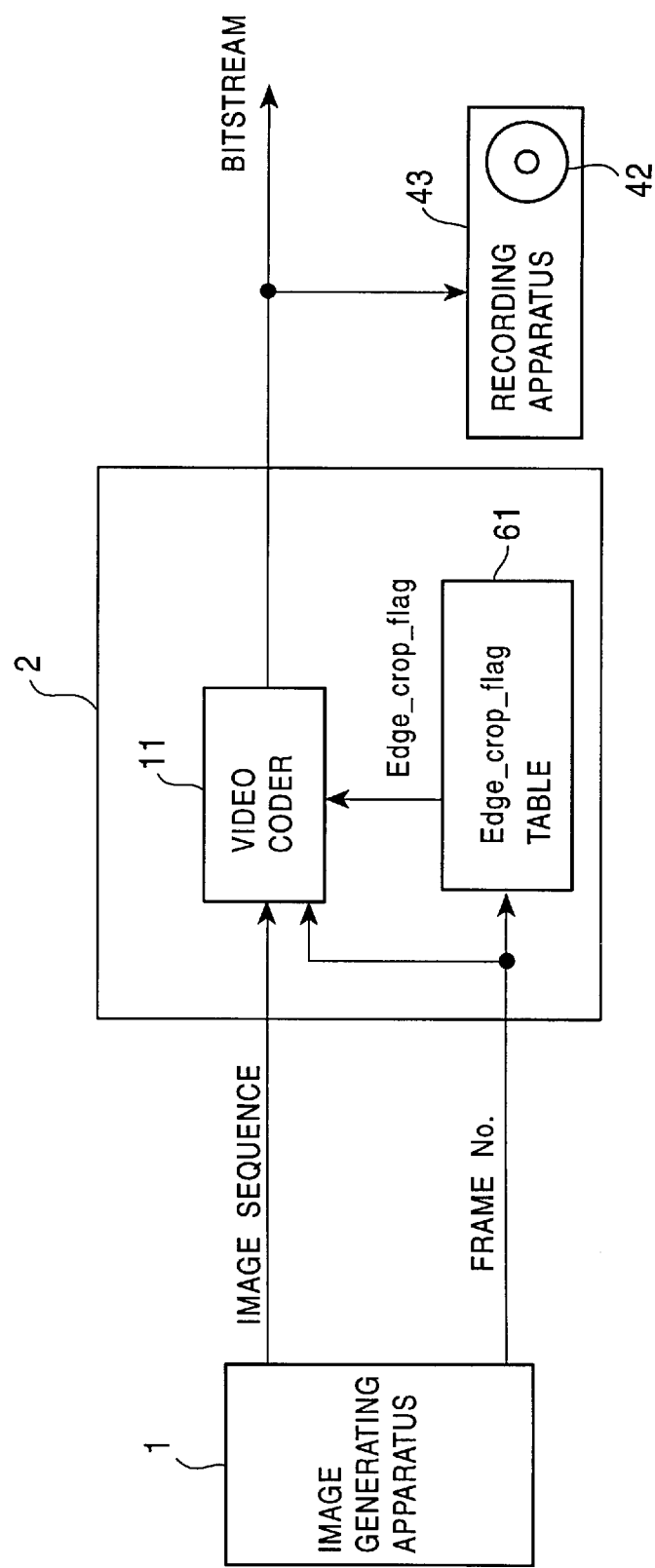
FIG. 8 is a block diagram illustrating another example of the construction of the coding apparatus of the present invention.

FIG. 8 shows another example of the construction of the coding apparatus. In this embodiment, an edge_crop_flag table 61 is provided in the coding apparatus 2, and a frame number is input from the image generating apparatus 1. The edge_crop_flag table 61 outputs a flag edge_crop_flag for each input frame number, and outputs it to the video coder 11. The video coder 11 codes (multiplexes) this flag edge_crop_flag together with the image and the frame number supplied from the image generating apparatus 1, and outputs it as video codes.

Therefore, in this embodiment of FIG. 8, the additional information coder 41 and the multiplexer 12, shown in FIG. 1, are omitted.

That is, in this embodiment, the video coder 11 codes the image and the frame number output from the image generating apparatus 1, as well as codes the flag edge_crop_flag which is input for each frame number from the edge_crop_flag table 61, multiplexes the flag onto the video codes, and outputs it.

For example, in the MPEG2, Video Syntax is defined as shown below.

```
video_sequence() {
    next_start_code()
    sequence_header()
    if (nextbits() == extension_start_code) {
        sequence_extension()
        do {
            extension_and_user_data(0)
            do {
                if ( nextbits() == group_start_code) {
                    group_of_pictures_header()
                    extension_and_user_data(1)
                }
                pictures_header()
                pictures_coding_extension()
                extensions_coding_and_user_data(2)
                pictures_data()
            } while ((nextbits() == pictures_start_code) ||
                    (nextbits() == group_start_code))
            if (nextbits() != sequence_end_code ) {
                sequence_header()
                sequence_extension()
            }
        } while (nextbits() != sequence_end_code )
    } else {
        /* ISO/IEC 11172-2 : MPEG1 */
    }
    sequence_end_code
}
```

In the above-described Syntax, extensions_and_user_data(2) is provided after the pictures_header(), for example, edge_crop_data() is defined as shown below in accordance with the Syntax of the extensions_and_user_data, and edge_crop_flag is coded within the edge_crop_data().

```
[Syntax of User_data defined in the MPEG]
user_data() {
    user_data_start_code
    while(nextbits() != "0000 0000 0000 0000 0000 0001") {
        user_data (8bit)
    }
    next_start_code()
}
```

Edge_Crop_data() is defined as shown below in accordance with the above-described Syntax.

```
Edge_Crop_data() {
    user_data_start_code
    while(nextbits() != "0000 0000 0000 0000 0000 0001") {
        Edge_Crop_flag   (1bit)
        reserved          (7bit)
    }
    next_start_code()
}
```

Therefore, in the coding apparatus of FIG. 8, the video coder 11 receives Edge_crop_flag and codes this as a part of User data of each image frame as described above.

Figure 9:
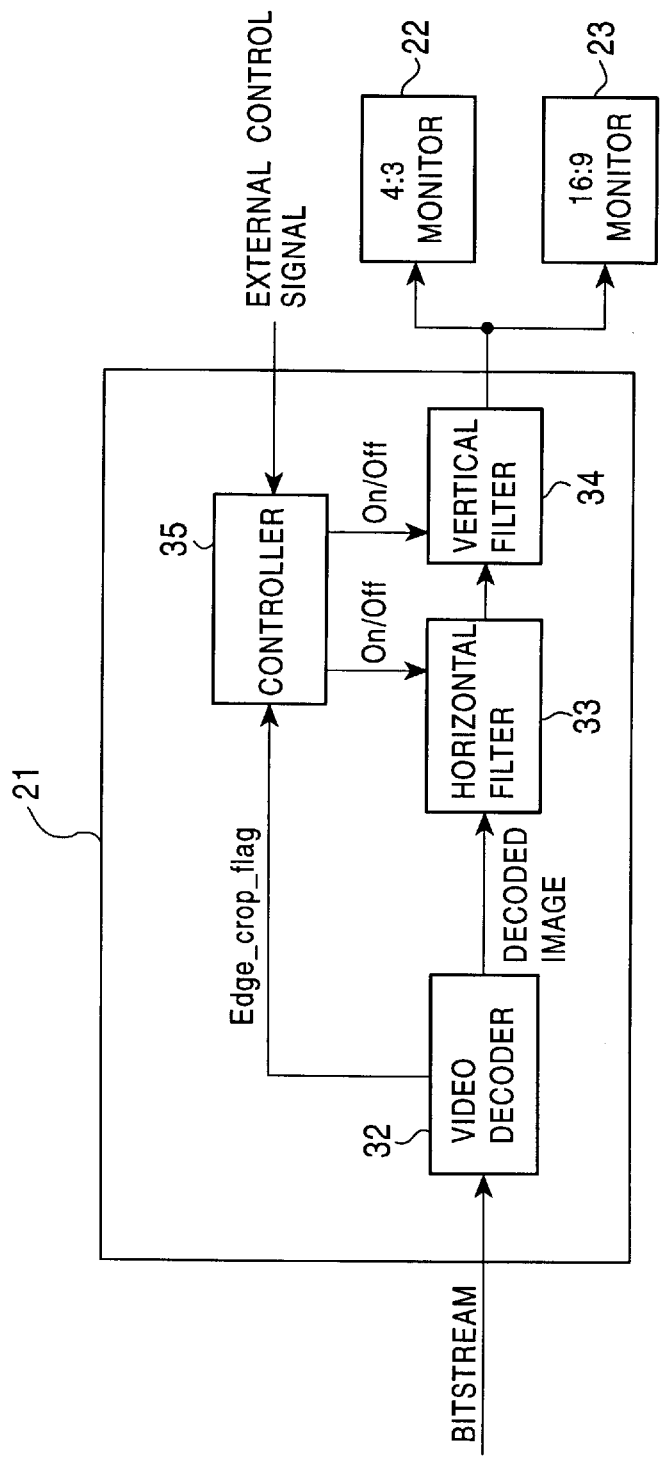
FIG. 9 is a block diagram illustrating another example of the construction of the decoding apparatus of the present invention.

FIG. 9 shows an example of the construction of the decoding apparatus for decoding the image signals coded by the coding apparatus of FIG. 8. The input video codes (the bitstream) are decoded by the video decoder 32. At this time, a decoded image is obtained, and Edge_Crop_flag (additional information) is decoded as a part of extensions_and_user_data(2) which follows each picture_header.

This Edge_Crop_flag is sent to the controller 35 at the timing in synchronization with the corresponding decoded image. The controller 35 controls the horizontal filter 33 and the vertical filter 34 in the same way as in the embodiment of FIG. 2 in accordance with the supplied Edge_Crop_flag and the external control signal.

In this embodiment, since edge_crop_flag (additional information) is added for each frame, it is not necessary to code and multiplex the timing information indicating the effective range of the flag, and since the signal is closed only in the Picture Layer, the construction becomes simple. However, conversely, it is necessary to explicitly code Edge_crop_flag for all the image frames. Further, since Edge_crop_flag is present in the Picture Layer, it is necessary to decode the video codes in order to know the value of the flag.

The present invention is not limited to these embodiments. For example, Edge_crop_flag and this image in the embodiment of FIGS. 1 and 2 are not necessarily required to be coded as a part of PSM of the system layer. For example, they may be coded as a private packet defined in the MPEG system layer.

Further, for example, the additional information in which Edge_crop_flag is coded in the embodiment in FIGS. 8 and 9 may be coded as a part of extension_and_user_data(0) which follows sequence_header by collecting for each sequence formed of a collection of group of pictures, or may be coded collectively for each group of pictures. In such a case, the edge crop is prohibited in units of sequence layer or GOP layer.

Although this embodiment describes only the edge cropped mode, the same applies to the squeezed mode as well. That is, since the image is displayed to be oblong in the squeezed mode, there are some owners of copyrights who think that originality is deteriorated. In this connection, it may be possible to provide a squeeze_flag indicating whether or not a display in the squeezed mode should be permitted.

That is, 1 bit from among 7 bits reserved for user data is assigned to such squeeze_flag, and the squeezed mode is forcibly changed to the letter box mode. Further, it is also possible to make edge_crop_flag serve also as a flag for prohibiting the squeezed mode. In such a case, regardless of the current display mode, both of the edge cropped mode and the squeezed mode are prohibited, and a display is forcibly made in the letter box mode.

According to one coding method, since image signals are coded, and additional information including a permission signal indicating whether or not a display of an image in a predetermined display state should be permitted is coded, it becomes possible to prevent the coding of an image which might be displayed in a display state which is against the intentions of the producer.

According to the record medium, since image signals, and a permission signal indicating whether or not a display of an image in a predetermined display state should be permitted are coded and multiplexed, and recorded, it becomes possible to prevent the recording of an image which might be displayed in a display state which is against the intentions of the producer.

According to the decoding apparatus and the display mode, since image signals and a permission signal are isolated from the input signals, and the display state of the isolated image signals is controlled in response to the isolated permission signal, it becomes possible to prevent the display of an image which might be displayed in a display state which is against the intentions of the producer.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An encoder for encoding an image signal representing a plurality of images displayed in at least first and second predetermined modes, comprising:

a first coder for coding said image signal; and a second coder for coding an additional information signal representing additional information corresponding to said image signal, said additional information including a flag for prohibiting said images to be displayed in said first predetermined mode, and including a time period during which said flag is effective such that said images are displayed only in said second predetermined mode if said flag is effective.

2. The apparatus according to claim 1, further comprising a multiplexor for multiplexing said image signal and said additional information signal.

3. The apparatus according to claim 1, wherein said time period is operative to correspond to each image in said plurality of images.

4. The apparatus according to claim 1, wherein each image has an aspect ratio, and wherein said first and second predetermined display modes are related to said aspect ratio.

5. The apparatus according to claim 1, wherein said first and second predetermined display modes include an edge cropped mode and a squeezed mode, respectively.

6. The apparatus according to claim 1, wherein said image signal is coded in accordance with a Motion Pictures Experts Group (MPEG) standard.

7. A data medium for recording an additional information signal and an image signal representing a plurality of images displayed in at least first and second predetermined modes, said image signal having been coded by a first coder and said additional information signal having been coded by a second coder, said additional information signal representing additional information that corresponds to said image signal and that includes a flag for prohibiting said images to be displayed in said first predetermined mode, said additional information further including a time period during which said flag is effective such that said images are displayed only in said second predetermined mode if said flag is effective, wherein said image signal and said additional information signal are multiplexed and recorded on said data medium.

8. The data medium according to claim 7, wherein each image has an aspect ratio, and wherein said first and second predetermined display modes are related to said aspect ratio.

9. The data medium according to claim 7, wherein said first and second predetermined display modes include an edge cropped mode and a squeezed mode, respectively.

10. Apparatus for decoding an input signal to provide an additional information signal and an image signal representing a plurality of images displayed in at least first and second predetermined modes, said image signal having been coded by a first coder and said additional information signal having been coded by a second coder, said additional information signal representing additional information that corresponds to said image signal and that includes a flag for prohibiting said images to be displayed in said first predetermined mode, said additional information further including a time period during which said flag is effective such that said images are displayed only in said second predetermined mode if said flag is effective, said apparatus comprising:

a demultiplexor for demultiplexing said image signal and additional information signal from said input signal;

a first decoder for decoding said image signal;

a second decoder for decoding said additional information signal; and a controller for controlling display of said images defined by the decoded image signal based on the decoded additional information.

11. The apparatus according to claim 10, wherein each image has an aspect ratio, and wherein said first and second predetermined display modes are related to said aspect ratio.

12. The apparatus according to claim 10, wherein said first and second predetermined display modes include an edge cropped mode and a squeezed mode, respectively.

13. The apparatus according to claim 10, further comprising a horizontal filter for modifying a horizontal length of an image.

14. The apparatus according to claim 10, further comprising a vertical filter for modifying a vertical length of an image.

15. The apparatus according to claim 10, further comprising means for inputting an external instruction for selectively specifying said first or second predetermined display mode, wherein if said flag is effective the specified display mode is prohibited regardless of said external instruction.

16. A method for decoding an input signal to provide an additional information signal and an image signal representing a plurality of images displayed in at least first and second predetermined modes, said image signal having been coded by a first coder and said additional information signal having been coded by a second coder, said additional information signal representing additional information that corresponds to said image signal and that includes a flag for prohibiting said images to be displayed in said first predetermined mode, said additional information further including a time period during which said flag is effective such that said images are displayed only in said second predetermined mode if said flag is effective, said method comprising the steps of:

demultiplexing said image signal and additional information signal from said input signal;

first decoding said image signal;

second decoding said additional information signal; and controlling display of said images defined by the decoded image signal based on the decoded additional information.

* * * * *